US012035090B2

(12) United States Patent
Marchant

(10) Patent No.: US 12,035,090 B2
(45) Date of Patent: Jul. 9, 2024

(54) PANEL LOUDSPEAKER TEMPERATURE MONITORING AND CONTROL

(71) Applicant: Google LLC, Mountain View, CA (US)

(72) Inventor: James Marchant, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 154 days.

(21) Appl. No.: 17/910,100

(22) PCT Filed: Mar. 13, 2020

(86) PCT No.: PCT/US2020/022693
§ 371 (c)(1),
(2) Date: Sep. 8, 2022

(87) PCT Pub. No.: WO2021/183139
PCT Pub. Date: Sep. 16, 2021

(65) Prior Publication Data
US 2023/0113894 A1 Apr. 13, 2023

(51) Int. Cl.
*H04R 29/00* (2006.01)
*H04R 1/02* (2006.01)

(52) U.S. Cl.
CPC .......... *H04R 1/028* (2013.01); *H04R 29/003* (2013.01)

(58) Field of Classification Search
CPC .......... H04R 7/04; H04R 7/045; H04R 9/022; H04R 29/001; H04R 29/003
See application file for complete search history.

(56) References Cited

U.S. PATENT DOCUMENTS 8,023,668 B2 * 9/2011 Pfaffinger ................ H04R 3/00 381/59
9,131,302 B2 * 9/2015 Williams ............... H04R 9/022
9,414,160 B2 * 8/2016 Van Schyndel ........ H04R 3/007
(Continued)

FOREIGN PATENT DOCUMENTS

KR 20100057261 5/2010
WO WO-2015012401 A1 * 1/2015 ........... H04R 29/003

OTHER PUBLICATIONS

International Search Report and Written Opinion in International Appln. No. PCT/US2020/022693, mailed on Sep. 18, 2020, 9 pages.
(Continued)

*Primary Examiner* — Ryan Robinson
(74) *Attorney, Agent, or Firm* — Fish & Richardson P.C.

(57) ABSTRACT

A panel audio loudspeaker includes a panel and an actuator attached to a surface of the panel and configured to cause vibration of the panel. The actuator comprises a magnetic coil in thermal communication with the panel. The panel audio loudspeaker further comprises a plurality of electrical sensors electrically coupled to the magnetic coil and configured to output time-varying electrical data for the magnetic coil, and an electronic control module in communication with the magnetic coil and the electrical sensors. The electronic control module is configured to perform operations comprising: providing a current to the magnetic coil; receiving the time-varying electrical data for the magnetic coil; determining an electrical energy provided to the magnetic coil between a first time and a second time; accessing a thermal model of the panel; and determining a change in a panel temperature between the first time and the second time.

20 Claims, 6 Drawing Sheets

(56) References Cited

U.S. PATENT DOCUMENTS

| | | | | |
|---|---|---|---|---|
| 9,473,851 | B2 * | 10/2016 | Galal | H03F 3/2173 |
| 9,883,305 | B2 * | 1/2018 | Risberg | H04R 3/002 |
| 9,942,676 | B1 | 4/2018 | Jensen et al. | |
| 10,250,978 | B1 * | 4/2019 | Palit | H03G 3/001 |
| 10,338,883 | B2 * | 7/2019 | Risberg | H04R 3/002 |
| 10,381,994 | B2 | 8/2019 | Button et al. | |
| 10,863,262 | B2 * | 12/2020 | Hoang Co Thuy | H04R 9/06 |
| 10,897,670 | B1 * | 1/2021 | Yang | H04R 29/001 |
| 11,153,682 | B1 * | 10/2021 | Li | H04R 29/001 |
| 11,159,888 | B1 * | 10/2021 | Zou | H04R 9/046 |
| 2015/0319529 | A1 | 11/2015 | Klippel | |
| 2019/0261092 | A1 | 8/2019 | Landick | |
| 2022/0295181 | A1 * | 9/2022 | Strutt | H04R 3/007 |

OTHER PUBLICATIONS

Klippel et al., “Nonlinear modeling of the heat transfer in loudspeakers,” Journal of the Audio Engineering Society, Feb. 1, 2004, 52(1/2): 3-25.

Office Action in Indian Appln. No. 202247051726, dated Nov. 29, 2022, 6 pages (with English translation).

Office Action in Korean Appln. No. 10-2022-7031107, dated Sep. 11, 2023, 11 pages (with English translation).

* cited by examiner

PANEL LOUDSPEAKER TEMPERATURE MONITORING AND CONTROL

CROSS-REFERENCE TO RELATED APPLICATION

This application is a National Stage Application under 35 U.S.C. § 371 and claims the benefit of International Application No. PCT/US2020/022693, filed Mar. 13, 2020, the disclosure of which is hereby incorporated by reference in its entirety.

TECHNICAL FIELD

This disclosure application relates generally to audio speakers.

BACKGROUND

This specification relates to actuators that include one or more electro-magnetic coils and to panel audio loudspeakers that feature the actuators.

Many electronic devices are capable of presenting multimedia content by including speakers which provide tonal, voice-generated, or recorded output. Panel audio loudspeakers can produce sound by inducing distributed vibration modes in a panel through an electro-acoustic actuator. The panel can include a display panel, for example. Typically, the actuators are electro-magnetic or piezoelectric actuators.

SUMMARY

This specification describes techniques, methods, systems, and other mechanisms for monitoring temperature of a panel in a panel audio device.

A panel audio loudspeaker can include an actuator including a magnetic coil that provides a force to a panel, causing the panel to vibrate to produce audible sound waves. The magnetic coil of the actuator may be in thermal communication with the panel, such that heat can flow between the magnetic coil and the panel. For example, the coil can be affixed to a surface of the panel, e.g., by an adhesive.

The panel may be, for example, a display panel of a mobile telephone, smart watch, or head-mounted display. It is desirable to predict, measure, and monitor a temperature of the panel. High panel temperatures may cause injury to a user, and may cause damage to the panel and connected components. For example, it may be desirable to maintain a panel temperature below 45 degrees Celsius to reduce risk of injury and damage.

During actuator operation, a control module for a panel audio loudspeaker can provide an electrical audio signal to the magnetic coil, and can measure electrical data for the magnetic coil. Based on the electrical data, the control module can determine an amount of energy applied to the magnetic coil during a period of time. Based on the amount of energy applied to the magnetic coil, a thermal model of the panel, and an initial temperature, the control module can determine a final temperature of the panel.

The control module may determine that the final temperature of the panel violates a limit or threshold temperature. In response to determining that the final temperature of the panel violates the threshold temperature, the control module can adjust the audio signal supplied to the magnetic coil. For example, the control module may reduce the current of the audio signal supplied to the magnetic coil. Reducing the current of the audio signal supplied to the magnetic coil may cause the panel temperature to increase at a slower rate, to cease increasing, or to decrease.

In general, one innovative aspect of the subject matter described in this specification can be embodied in a panel audio loudspeaker, including: a panel; an actuator attached to a surface of the panel and configured to cause vibration of the panel, the actuator including a magnetic coil in thermal communication with the panel; a plurality of electrical sensors electrically coupled to the magnetic coil and configured to output time-varying electrical data for the magnetic coil; and an electronic control module in communication with the magnetic coil and the plurality of electrical sensors. The electronic control module is configured to perform operations including: providing a current to the magnetic coil; receiving, from the plurality of electrical sensors, the time-varying electrical data for the magnetic coil; based on the time-varying electrical data for the magnetic coil, determining an electrical energy provided to the magnetic coil between a first time and a second time; accessing a thermal model of the panel; and based on the electrical energy provided to the magnetic coil, and the thermal model of the panel, determining a change in a panel temperature between the first time and the second time.

The foregoing and other embodiments can each optionally include one or more of the following features, alone or in combination. In some implementations, the time-varying electrical data includes one or more of: a time-varying current through the magnetic coil; and a time-varying voltage across the magnetic coil.

In some implementations, the thermal model of the panel includes one or more of: data representing heat transfer from the magnetic coil to the panel; and data representing heat transfer from the panel to ambient.

In some implementations, the thermal model of the panel includes an association curve between the electrical energy provided to the magnetic coil and the change in the panel temperature.

In some implementations, determining the electrical energy provided to the magnetic coil includes: determining, from the time-varying electrical data for the magnetic coil, a time-varying power provided to the magnetic coil; and integrating the time-varying power between the first time and the second time.

In some implementations, the operations further include: determining, from the time-varying electrical data for the magnetic coil and the thermal model of the panel, a first panel temperature at the first time; based on the first panel temperature, and the change in the panel temperature between the first time and the second time, determining a second panel temperature at the second time; and based on the second panel temperature, adjusting the current provided to the magnetic coil.

In some implementations, the operations further include: determining, from the change in the panel temperature between the first time and the second time, a rate of change of the panel temperature; and based on the rate of change of the panel temperature, adjusting the current provided to the magnetic coil.

In some implementations, the electronic control module includes one or more of an audio signal source, an amplifier, and a digital signal processor.

In some implementations, the panel includes a display panel.

In general, one innovative aspect of the subject matter described in this specification can be embodied in a mobile device, including a housing and the panel audio loudspeaker.

In some implementations, the mobile device includes a mobile phone or a tablet computer.

In general, one innovative aspect of the subject matter described in this specification can be embodied in a wearable device, including a housing and the panel audio loudspeaker.

In some implementations, the wearable device is a smart watch or a head-mounted display.

In general, one innovative aspect of the subject matter described in this specification can be embodied in a method including: providing a current to a magnetic coil of an actuator to cause vibration of a panel, the magnetic coil being in thermal communication with the panel; receiving, from a plurality of electrical sensors electrically coupled to the magnetic coil, time-varying electrical data for the magnetic coil; based on the time-varying electrical data for the magnetic coil, determining an electrical energy provided to the magnetic coil between a first time and a second time; accessing a thermal model of the panel; and based on the electrical energy provided to the magnetic coil, and the thermal model of the panel, determining a change in a panel temperature between the first time and the second time.

The foregoing and other embodiments can each optionally include one or more of the following features, alone or in combination. In some implementations, the time-varying electrical data includes one or more of: a time-varying current through the magnetic coil; and a time-varying voltage across the magnetic coil.

In some implementations, the thermal model of the panel includes one or more of: data representing heat transfer from the magnetic coil to the panel; and data representing heat transfer from the panel to ambient.

In some implementations, determining the electrical energy provided to the magnetic coil includes: determining, from the time-varying electrical data for the magnetic coil, a time-varying power provided to the magnetic coil; and integrating the time-varying power between the first time and the second time.

In some implementations, the method further includes: determining, from the time-varying electrical data for the magnetic coil and the thermal model of the panel, a first panel temperature at the first time; based on the first panel temperature, and the change in the panel temperature between the first time and the second time, determining a second panel temperature at the second time; and based on the second panel temperature, adjusting the current provided to the magnetic coil.

In some implementations, the method further includes: determining, from the change in the panel temperature between the first time and the second time, a rate of change of the panel temperature; and based on the rate of change of the panel temperature, adjusting the current provided to the magnetic coil.

In some implementations, the method further includes: adjusting the current provided to the magnetic coil includes reducing the current provided to the magnetic coil.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
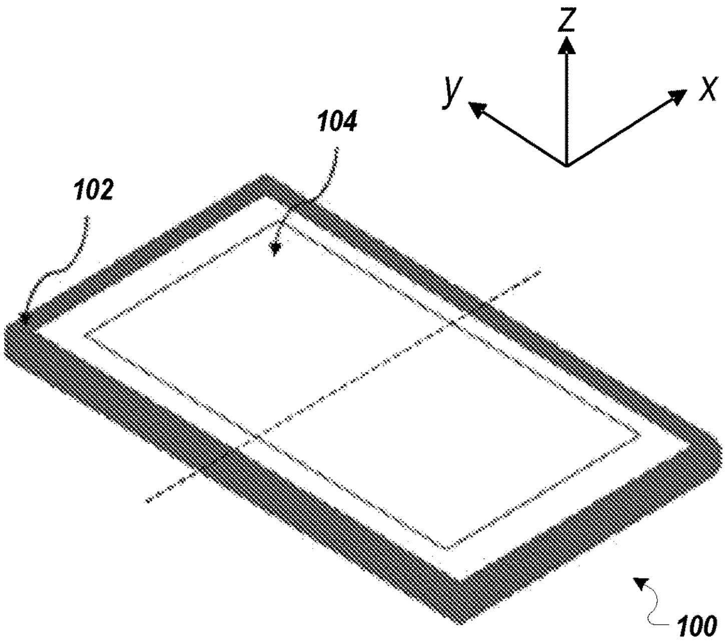
FIG. 1 is a perspective view of an embodiment of a mobile device.

In general, actuator modules can be used in a variety of applications. For example, in some embodiments, an actuator module can be used to drive a panel of a panel audio loudspeaker, such as a distributed mode loudspeaker (DML). Such loudspeakers can be integrated into a mobile device, such as a mobile phone, a smart watch, or a head-mounted display. For example, referring to FIG. 1, a mobile device 100 includes a device chassis 102 and a panel 104 including a flat panel display (e.g., an OLED or LCD display panel) that integrates a panel audio loudspeaker. Mobile device 100 interfaces with a user in a variety of ways, including by displaying images and receiving touch input via panel 104. Typically, a mobile device has a depth (in the z-direction) of approximately 10 mm or less, a width (in the x-direction) of 60 mm to 80 mm (e.g., 68 mm to 72 mm), and a height (in the y-direction) of 100 mm to 160 mm (e.g., 138 mm to 144 mm). A Cartesian coordinate system is shown in FIG. 1 for reference.

The mobile device 100 also produces audio output. The audio output is generated using a panel audio loudspeaker that creates sound by causing the flat panel display to vibrate. The display panel is coupled to an actuator, such as a distributed mode actuator, or DMA. The actuator is a movable component arranged to provide a force to a panel, such as the panel 104, causing the panel to vibrate. The vibrating panel generates human-audible sound waves, e.g., in the range of 20 Hz to 20 kHz.

Generally, the efficiency of the actuator to produce audible sound waves varies as a function of frequency depending on the properties of the actuator, the panel, and the coupling of the actuator to the panel. Typically, the actuator/panel system will exhibit one or more resonant frequencies representing frequencies at which the sound pressure level as a function of frequency has a local maximum. It is generally desirable, however, for a panel audio loudspeaker to maintain a relatively high sound pressure level across the entire audio frequency spectrum.

In addition to producing sound output, the mobile device 100 can also produce haptic output using the actuator. For example, the haptic output can correspond to vibrations in the range of 180 Hz to 300 Hz.

Figure 2:
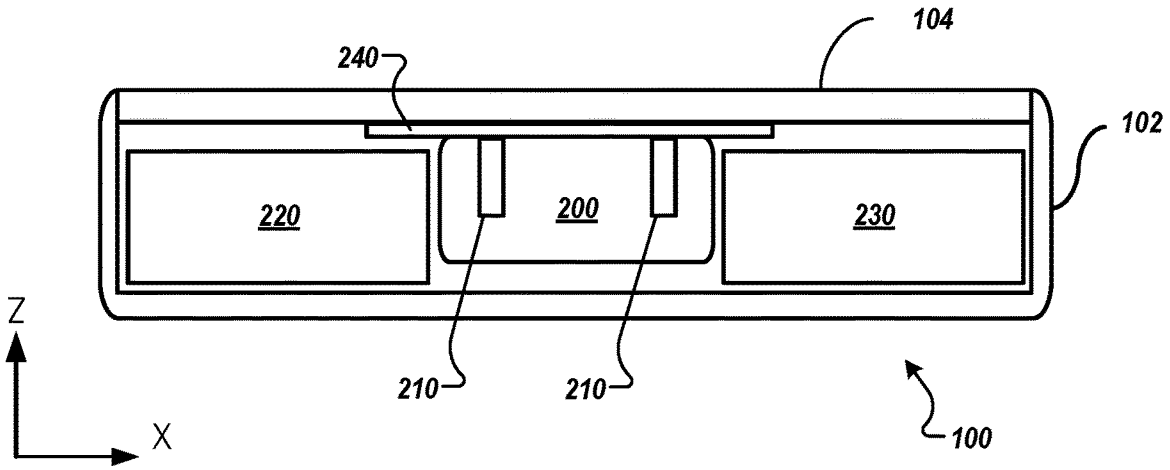
FIG. 2 is a schematic cross-sectional view of the mobile device of FIG. 1.

FIG. 1 also shows a dashed line that corresponds to the cross-sectional direction shown in FIG. 2. Referring to FIG. 2, a cross-section of mobile device 100 illustrates device chassis 102 and the panel 104. FIG. 2 also includes a Cartesian coordinate system with x, y, and z axes, for ease of reference. The device chassis 102 has a depth measured along the z-direction and a width measured along the x-direction. The device chassis 102 also has a back panel, which is formed by the portion of device chassis 102 that extends primarily in the x-y plane. The mobile device 100 includes the actuator module 200, which is housed behind the panel 104 in the chassis 102 and attached to the back side of the panel 104. A pressure sensitive adhesive (PSA) 240 can attach the actuator module 200 to the panel 104. Generally, the actuator module 200 is sized to fit within a volume constrained by other components housed in the chassis, including an electronic control module 220 and a battery 230.

The actuator module 200 can be configured to convert electrical energy into acoustic energy. The actuator module 200 can be controlled by the electronic control module 220. The electronic control module 220 can be composed of one or more electronic components that receive input from one or more sensors and/or signal receivers of the mobile device 100, process the input, and generate and deliver signal waveforms that cause actuator module 200 to provide a suitable haptic response. The electronic control module 220 can be in communication with the magnetic coil 210.

Referring to FIG. 2, the actuator module 200 includes a magnetic coil 210 and the PSA 240. The PSA 240 allows the actuator module 200 to be affixed to the panel 104. The actuator module 200 can be relatively compact. For example, the actuator module's height (i.e., its dimension in the z-direction) can be about 10 mm or less (e.g., 8 mm or less, 6 mm or less, 5 mm or less).

During operation, the electronic control module 220 energizes the magnetic coil 210 by applying an electric current to the magnetic coil 210. The resulting magnetic flux interacts with a suspended magnet, and the resulting vibrations are transferred to the panel 104.

The magnetic coil 210 can be constructed using a thin wire that is suspended within a magnetic field generated by a magnet. When an analog signal, which can be an input voltage signal, passes through the magnetic coil 210, an electro-magnetic field is produced. The electro-magnetic field signal strength is determined by the current flowing through coil.

The magnetic coil 210 is attached to a surface of the panel 104, which also moves in tandem. The magnetic coil 210 may be affixed to the surface of the panel 104 by an adhesive, e.g., a pressure sensitive adhesive, a liquid adhesive, etc. Movement of the panel can cause a disturbance in the air around it, thus producing a sound. In the instances where the input signal is a sine wave, then the panel 104 will pulsate (e.g., in and out) which pushes air as it moves, and generates an audible tone, representing the frequency of the signal. The strength, and therefore the velocity, by which the panel 104 moves and pushes the surrounding air may be determined at least in part based on the input signal applied to the magnetic coil 210.

The magnetic coil 210 can be in thermal communication with the panel 104. When in thermal communication with the panel, heat can flow, or transfer, from the magnetic coil 210 to the panel 104, and from the panel 104 to the magnetic coil 210. For example, when the electronic control module 220 drives the magnetic coil 210, current flows through the magnetic coil 210, heating the magnetic coil 210. Heat from the magnetic coil 210 may then transfer to the panel 104.

During operation of the actuator module 200, a magnetic coil temperature may rise, causing a panel temperature to also rise. As the panel 104 receives heat from the magnetic coil 210, the panel 104 may also lose heat to ambient. Thus, during operation, the panel temperature may rise at a slower rate of change than the magnetic coil temperature, and the panel temperature may remain lower than the magnetic coil temperature.

When the actuator module 200 is not in operation, the magnetic coil temperature may fall, causing the panel temperature to also fall. During an extended time when the actuator module 200 is not in operation, the magnetic coil 210 and the panel 104 may reach thermal equilibrium. Thus, when current has not passed through the magnetic coil 210 for an extended period of time, the magnetic coil 210 and the panel 104 may reach the same temperature.

Figure 3:
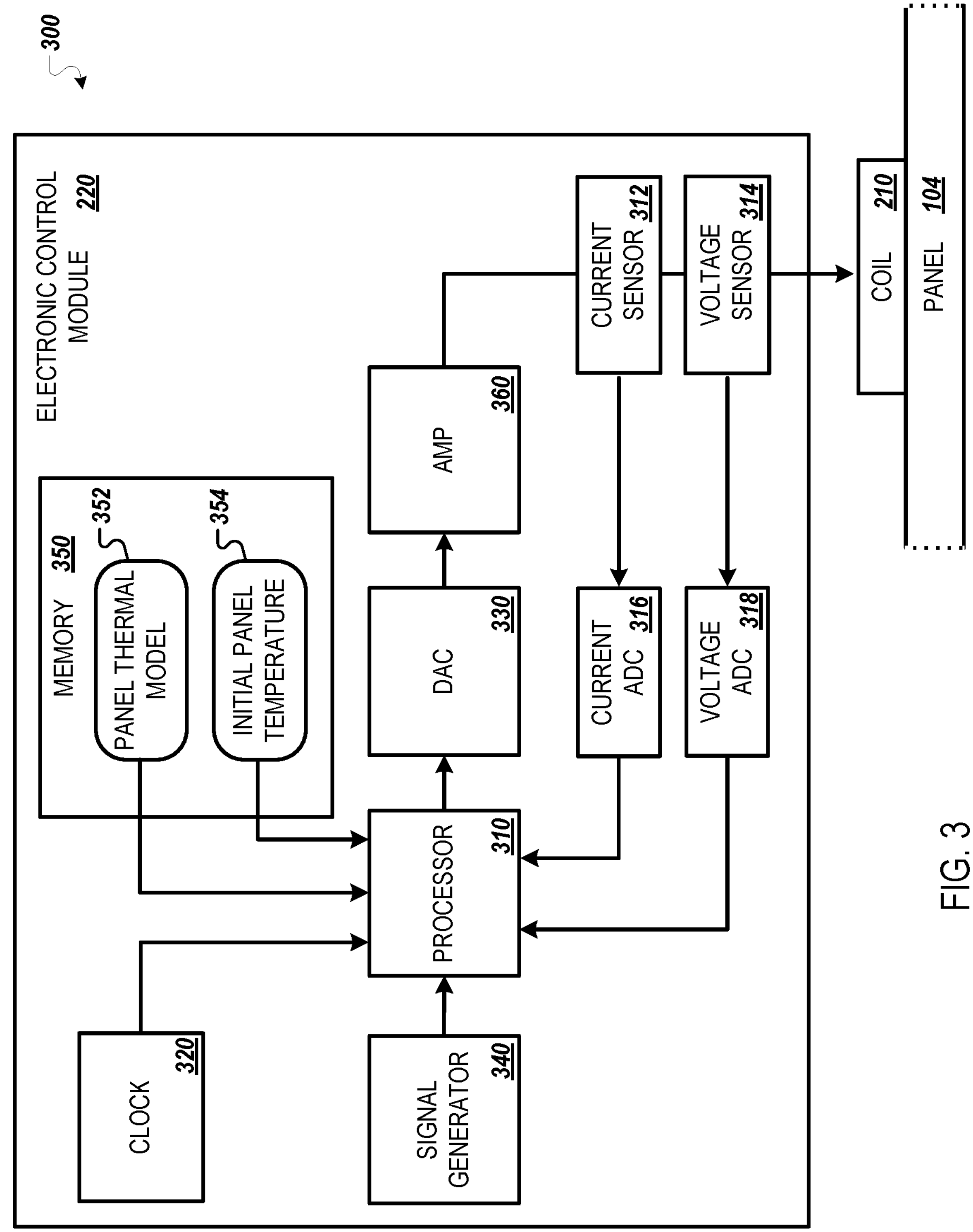
FIG. 3 is a block diagram of an example system configured to monitor temperature of a panel in a panel audio device.

FIG. 3 is a diagram of an example system 300 configured to monitor temperature of a panel in a panel audio device. The system 300 includes the electronic control module 220, the magnetic coil 210, and the panel 104. The electronic control module 220 includes a signal generator 340, a processor 310, a digital-to-analog converter (DAC) 330, an amplifier 360, a current sensor 312, a current analog-to-digital converter (ADC) 316, a voltage sensor 314, a voltage ADC 318, a clock 320, and a memory 350 that can store a panel thermal model 352 and an initial panel temperature 354.

Though a particular configuration of the system 300 is shown in FIG. 3, other configurations are possible. For example, in some implementations, certain components might not be included in the electronic control module 220 as shown. For example, the signal generator 340, the clock 320, and/or the amplifier 360 might not be included in the electronic control module 220. In some implementations, certain components may be combined into a single component. For example, the amplifier 360 may include the processor 310, the DAC 330, or both. In some examples, the processor 310 may include the memory 350, the DAC 330, the current ADC 316, the voltage ADC 318, or all of these.

In general, operations of the system 300 are as follows. The magnetic coil 210 can be in communication with the electronic control module 220, e.g., through a wired or wireless connection. The magnetic coil 210 can receive, as input, an electrical signal that has been output from the amplifier 360. As the electrical signal is applied to the magnetic coil 210, the magnetic coil temperature may rise, and in turn, the panel temperature may also rise.

Electrical sensors can measure time-varying electrical data for the magnetic coil 210. For example, the current sensor 312 can measure a time-varying current through the magnetic coil 210, and the voltage sensor 314 can measure a time-varying voltage across the magnetic coil 210. The processor 310 can determine an amount of energy supplied to the magnetic coil 210 over a period of time, based on the measured coil current and coil voltage. Based on the supplied energy, the panel thermal model 352, and the initial panel temperature 354, the processor 310 can determine a final temperature of the panel 104. Based on the final temperature of the panel 104, the processor 310 may determine to adjust the electrical signal provided to the magnetic coil 210.

The signal generator 340 can be an audio signal source that generates an audio signal. For example, the signal generator can generate a digital audio signal representing an audible sound to be produced by the panel 104.

The processor 310 can be, for example, a digital signal processor (DSP). The processor 310 can receive the audio signal from the signal generator 340. The processor 310 can process the audio signal, for example, by decoding, filtering, decompressing, transforming, and modulating the audio signal. In some examples, the processor 310 can adjust the audio signal by increasing or decreasing a power level of the audio signal. The processor 310 can output an adjusted digital audio signal to the DAC 330.

The DAC 330 can convert the digital audio signal to an analog electrical signal. The analog electrical signal can be, for example, an alternating current (AC) electrical signal. The DAC 330 can output the analog electrical signal to the amplifier 360.

The amplifier 360 can amplify the analog electrical signal. For example, the amplifier 360 can amplify the analog electrical signal by increasing the voltage, current, or power of the analog signal. The amplifier 360 can output the amplified electrical signal to the magnetic coil 210.

The magnetic coil 210 is energized by the amplified electrical signal output by the amplifier 360. As current from the amplified electrical signal flows through the magnetic coil 210, the magnetic coil temperature may rise. The panel 104, in thermal communication with the magnetic coil 210, may receive heat transferred from the magnetic coil 210, causing the panel temperature to rise.

The current sensor 312 can measure electrical current flowing through the magnetic coil 210. The current sensor 312 can be any appropriate type of current sensor. For example, the current sensor 312 may be a flux gate, hall-effect, or inductive current sensor. The current sensor 312 can output an analog signal representing the measured current to the current ADC 316. The current ADC 316 can convert the analog signal representing the measured coil current to a digital current signal. The current ADC 316 can output the coil current to the processor 310.

In some examples, the current sensor 312 may output a digital signal representing the measured coil current. In these examples, the system 300 might not include the current ADC 316, and the current sensor 312 may provide the coil current directly to the processor 310.

The voltage sensor 314 can measure voltage across the magnetic coil 210. The voltage sensor 314 can be any appropriate type of voltage sensor. For example, the voltage sensor 314 may be a resistive or capacitive voltage sensor. The voltage sensor 314 can output an analog signal representing the measured voltage to the voltage ADC 318. The voltage ADC 318 can convert the analog signal representing the measured voltage to a digital voltage signal. The voltage ADC 318 can output the coil voltage to the processor 310.

In some examples, the voltage sensor 314 may output a digital signal representing the measured coil voltage. In these examples, the system 300 might not include the voltage ADC 318, and the voltage sensor 314 may provide the coil voltage directly to the processor 310.

The processor 310 can receive the coil current and the coil voltage from the current ADC 316 and the voltage ADC 318. The processor 310 can determine the panel temperature based on the coil current and the coil voltage. Determining the panel temperature based on the coil current and the coil voltage is described with reference to FIG. 4.

Figure 4:
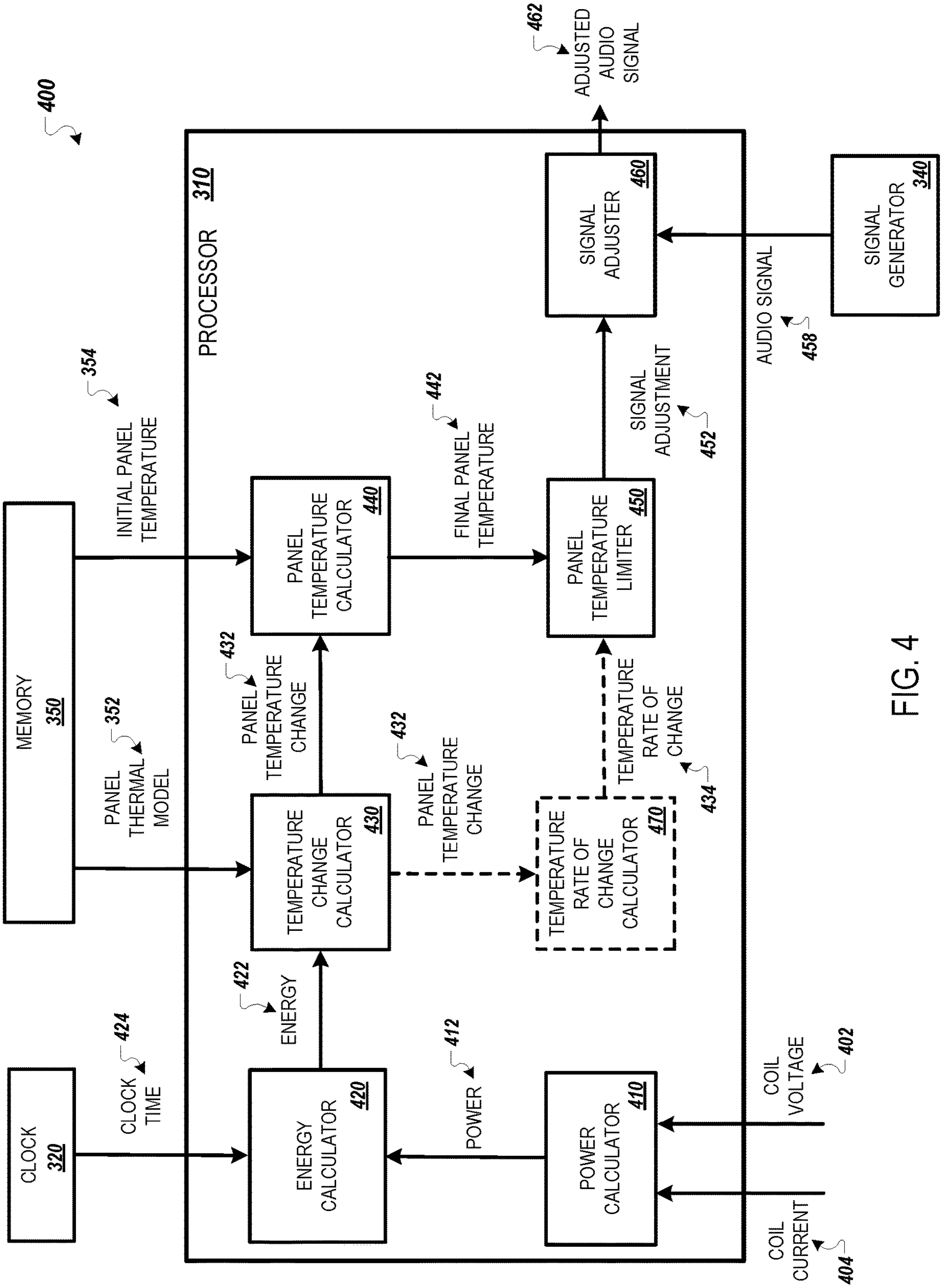
FIG. 4 is a block diagram of an example processor of the example system of FIG. 3.

Referring to FIG. 4, the processor 310 includes a power calculator 410, an energy calculator 420, a temperature change calculator 430, a panel temperature calculator 440, a panel temperature limiter 450, and a signal adjuster 460. The processor 310 can also optionally include a temperature rate of change calculator 470.

The power calculator 410 of the processor 310 can receive a time-varying coil current 404 and a time-varying coil voltage 402 from the current ADC 316 and the voltage ADC 318, respectively. The coil current 404 can be indicated, for example, in a unit of Amperes (A). The coil voltage can be indicated, for example, in a unit of Volts (V). Based on the coil current 404 and the coil voltage 402, the power calculator 410 can calculate a power 412 of the magnetic coil 210. Specifically, the power calculator 410 can multiply the coil current 404 and the coil voltage 402 at a particular time to calculate the power 412 at the particular time. The power calculator 410 may continuously calculate the time-varying power 412. The power 412 can be indicated, for example, in a unit of Watts (W). An example graph of time-varying power 412 is shown in FIG. 5A.

Figure 5A:
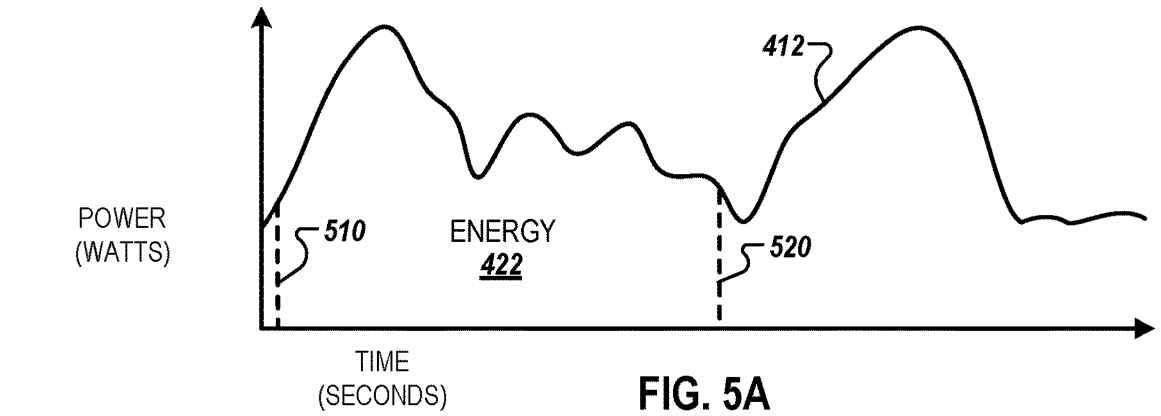
FIGS. 5A, 5B, and 5C illustrate example graphs and curves used for panel audio temperature monitoring.

Referring to FIG. 5A, the power 412 can be represented on a graph as a function of time. In general, the power 412 may increase, decrease, or remain steady over time while the actuator module 200 is in operation. For example, the audio signal may increase and decrease in power over time due to changes in audio volume, e.g., music or voice volume.

In FIG. 5A, the power 412 is graphed over a period of time that includes a first time 510 and a second time 520. The first time 510 can be, for example, a period of time shortly after initially energizing the magnetic coil 210. The second time 520 can be a time later than the first time 510.

The energy calculator 420 of the processor 310 can receive the time-varying power 412 from the power calculator 410. The energy calculator 420 can also receive a clock time 424 from the clock 320. Based on the varying power 412 over time, the energy calculator 420 can calculate an energy 422 supplied to the magnetic coil 210. Specifically, as shown in FIG. 5A, the energy calculator 420 can integrate the time-varying power 412 between the first time 510 and the second time 520 to determine the total energy 422 supplied between the first time 510 and the second time 520.

In FIG. 5A, the energy 422 is represented by an area under the curve representing the time-varying power 412. The energy 422 can be indicated, for example, in a unit of Joules (J). In general, higher power levels maintained over longer periods of time result in a larger area under the curve, and thus larger amounts of energy supplied to the magnetic coil. The energy calculator 420 can output the energy 422 to the temperature change calculator 430.

The temperature change calculator 430 can receive the energy 422 from the energy calculator 420, and the panel thermal model 352 from the memory 350. In some examples, the panel thermal model 352 can be an experimental model. For example, experiments can be performed on the panel 104 or a similar panel to determine panel temperature behavior in response to energization of the magnetic coil 210. Experiments can include energizing the magnetic coil 210 at known power levels for various time durations, and measuring a resulting temperature of the panel 104. The resulting temperature of the panel 104 may be measured, for example, directly using a temperature sensor, or indirectly based on a resistance of the magnetic coil. In some examples, the electronic control module can determine that the magnetic coil 210 and the panel are likely at approximately the same temperature.

Figure 5B:
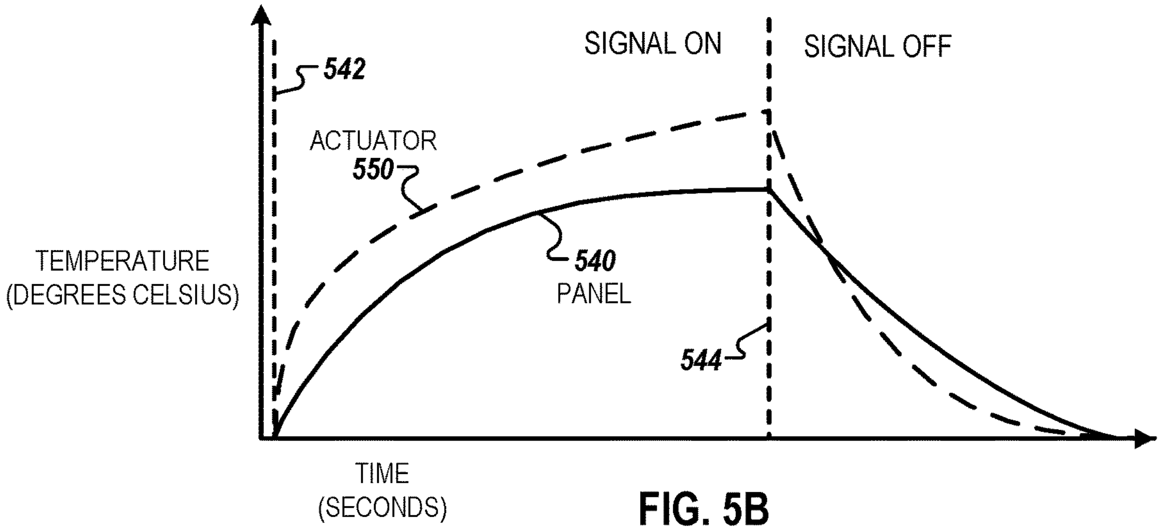

FIG. 5B shows an example temperature characteristic curve for the panel 104. The characteristic curve can be generated by energizing the magnetic coil 210 with an audio signal at a steady, known power for a time duration, and then turning the audio signal off. As shown in FIG. 5B, panel temperature 540 and actuator temperature 550 can be represented on a graph as a function of time. Temperature change 432 can be indicated, for example, in a unit of degrees Celsius (° C.). At time 542, the audio signal turns on and energizes the magnetic coil 210 at a constant power. At time 544, the audio signal turns off.

Between time 542 and time 544, the actuator temperature 550 and the panel temperature 540 rise. For example, the actuator temperature 550 rises due to being energized by the audio signal, and the panel temperature 540 rises due to heat transfer from the magnetic coil 210. The actuator temperature 550 may change temperature more rapidly than the panel temperature 540, due to the magnetic coil 210 having a lower thermal mass than the panel 104. After time 544, when the audio signal is off, the actuator temperature 550 and the panel temperature 540 fall.

Temperature characteristic curves may be generated for various power levels and durations of time. From the temperature characteristic curves, the processor 310 can obtain a temperature rate of change for a particular power level at a given temperature. For example, the temperature characteristic curves can indicate that the panel temperature 540 changes 1 degree Celsius (° C.) per minute per Watt at an initial temperature of 35° C. Temperature characteristic curves for the panel 104 may be generated experimentally and stored in the memory 350.

In some examples, the panel thermal model 352 can be a mathematical model. For example, the panel thermal model 352 can include data representing heat transfer from the magnetic coil 210 to the panel 104, data representing heat transfer from the panel 104 to ambient, or both. The panel thermal model 352 can also include a model of panel temperature behavior in response to energization of the magnetic coil 210. The data may account for factors such as the specific heat capacity of the panel 104, the surface area of contact between the magnetic coil 210 and the panel 104, and the total surface area of the panel 104. The data may also account for factors such as changes in ambient temperature, changes in panel vibration frequency, and continuity of energization.

In some examples, the panel thermal model 352 can be a mathematical model that can be updated and verified experimentally. For example, the panel thermal model 352 can be generated mathematically for predicted panel temperature. Experiments can then be performed on the panel 104 or a similar panel to verify and/or update the panel thermal model 352. Experiments can include energizing the magnetic coil 210 at steady power levels for various time durations and generating a temperature characteristic curves as shown in FIG. 5B. The resulting temperature of the panel 104 can be provided as feedback to the panel thermal model 352 in order to update the mathematical model.

In some examples, the panel thermal model 352 can be calibrated during a calibration phase of operation. For example, a preliminary thermal model may be programmed into the memory 350. During the calibration phase, the electronic control module 220 can energize the magnetic coil 210 at known power levels, and the panel temperature can be measured. The panel thermal model 352 can then be updated based on the panel temperature measured during the calibration phase.

In some examples, instead of, or in addition to, the calibration phase, the panel thermal model 352 may continue to update during operation. For example, an audio signal may be applied to the magnetic coil 210 between a first time and a second time. While the audio signal is applied to the magnetic coil 210, the actuator temperature 550 and the panel temperature 540 rise.

During a time duration between a second time and a third time, the audio signal may be off, or may be reduced to a lower power, such that heat from the actuator is no longer causing the panel temperature 540 to rise. The time duration may be equal to or longer than a threshold duration during which the actuator temperature 550 becomes approximately equal to the panel temperature 540. The processor 310 can then measure the resistance of the magnetic coil 210 to determine the actuator temperature 550, and therefore determine a measured panel temperature.

The processor 310 can also determine a calculated panel temperature at the third time based on the panel thermal model 352. The processor 310 can then compare the measured panel temperature based on the actuator temperature 550 to the calculated panel temperature based on the thermal model. The processor 310 can calculate an error between the measured panel temperature and the calculated panel temperature. The processor 310 can provide the error as feedback to adjust one or more variables of the panel thermal model 532.

In an example, an initial panel temperature 354 is 33° C. An audio signal is applied to the magnetic coil 210 between a first time T1 and a second time T2. At time T2, the audio signal turns off and remains off until time T3. The time duration between T2 and T3 is a time duration longer than the threshold duration during which the actuator temperature 550 becomes approximately equal to the panel temperature 540.

The processor 310 measures the resistance of the magnetic coil 210 at time T3. Based on the resistance, the processor determines an actuator temperature of 40° C., and therefore a measured panel temperature of 40° C. The processor 310 determines a calculated panel temperature of 42° C. based on the panel thermal model 352. The processor 310 calculates an error of 2° C. The processor 310 provides the error as feedback to adjust the panel thermal model 532.

At the third time, the audio signal may again be applied to the magnetic coil 210. The processor 310 can use the measured temperature at the third time as the initial panel temperature 354 for a next calculation of final panel temperature 442. In the above example, the measured panel temperature of 40° C. can be used as the initial panel temperature 354 for the next calculation of final panel temperature 442, e.g., the panel temperature at a fourth time T4.

Figure 5C:
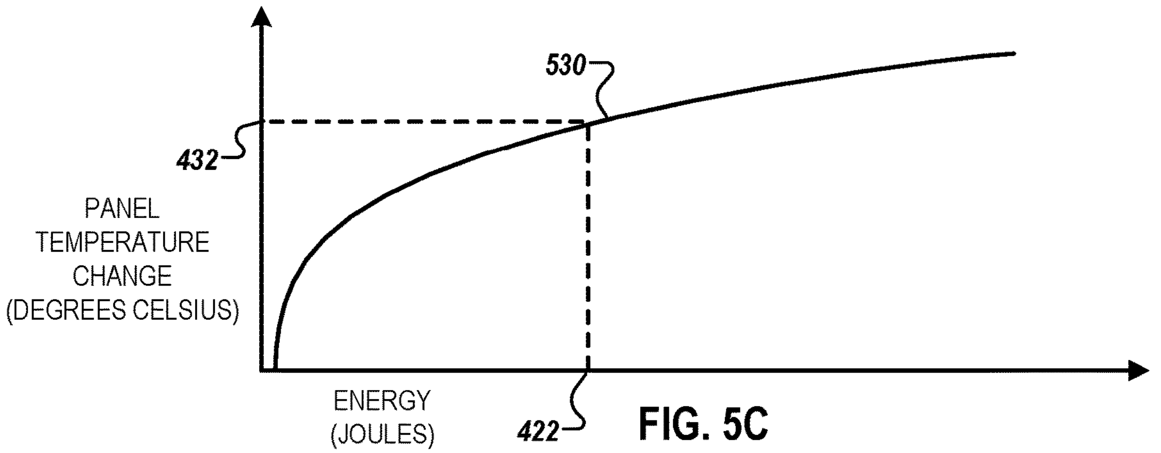

In some examples, the panel thermal model 352 can include a panel thermal model curve 530 representing an association between energy and panel temperature change, as shown in FIG. 5C. The panel thermal model curve 530 may be generated based on temperature characteristic curves as shown in FIG. 5B. For example, the temperature characteristic curve can provide temperature rate of change for a particular power level at a given temperature. From multiple temperature characteristic curves, the temperature rate of change for an amount of energy may be determined. In some examples, multiple panel thermal model curve 530 may be generated for multiple initial temperatures.

Referring to FIG. 5C, the panel thermal model curve 530 can be represented on a graph as a function of energy. In general, the panel temperature change increases with increased energy, e.g., for a greater amount of energy supplied to the magnetic coil 210, the panel temperature may change a greater amount. Though FIG. 5C shows a curve with an approximately logarithmic shape, the shape of the panel thermal model curve 530 may vary depending on characteristics of the panel. The shape of the panel thermal model curve 530 may be, for example, linear, exponential, or parabolic.

The panel thermal model 352 can be programmed into the memory 350. The processor 310 can then access the panel thermal model 352 from the memory 350 in order to determine the panel temperature change 430.

Using the panel thermal model curve 530, the temperature change calculator 430 can calculate a panel temperature change associated with the energy 422. In the example of FIG. 5C, the temperature change calculator 430 calculates a panel temperature change 432. The panel temperature change 432 represents the change in panel temperature between the first time 510 and the second time 520. The temperature change calculator 430 can output the panel temperature change 432 to the panel temperature calculator 440.

The panel temperature calculator 440 can receive the panel temperature change 432 from the temperature change calculator 430, and the initial, or first, panel temperature 354 from the memory 350. The initial panel temperature 354 can be the panel temperature at the first time 510. In some examples, at or before the first time 510, the processor 310 can determine the initial panel temperature 354, and store the initial panel temperature 354 in the memory 350.

In some examples, the processor 310 can determine the initial panel temperature 354 based on the magnetic coil temperature at the first time 510. In some examples, the panel thermal model 352 can include an association between the panel temperature and the magnetic coil temperature.

In some examples, the processor 310 can determine that the panel temperature is likely the same as the magnetic coil temperature. For example, based on the panel thermal model 352, the processor 310 may determine that when the magnetic coil 210 is not energized for a certain duration of time, the panel 104 reaches a temperature that is the same, or approximately the same, as the magnetic coil temperature. The processor 310 can therefore determine, based on the magnetic coil 210 not being energized for the certain duration of time, that the initial panel temperature 354 is the same as the magnetic coil temperature.

In some examples, the first time 510 may be a time shortly after initially energizing the magnetic coil 210 following the certain duration of time that the magnetic coil 210 is not energized. In these examples, the processor 310 may determine that the initial panel temperature 354 at the first time 510 is the same as the magnetic coil temperature at the first time 510.

In some examples, the processor 310 can determine the magnetic coil temperature based on a resistance of the magnetic coil 210 during operation of the actuator module 200. For example, the processor 310 may determine the resistance of the magnetic coil 210 based on the coil current 404 and the coil voltage 402 while the actuator module 200 is operating. The magnetic coil 210 may have a known temperature coefficient of resistance. Thus, based on the resistance of the magnetic coil 210, the processor 310 can determine the magnetic coil temperature. Based on the association between the magnetic coil temperature and the panel temperature, the processor 310 can determine the initial panel temperature 354.

In some examples, the processor 310 can determine the magnetic coil temperature based on a resistance of the magnetic coil 210 when the actuator module 200 is not operating. For example, the processor 310 can provide a pilot tone to the magnetic coil 210. The pilot tone can be, for example, a low amplitude and/or low frequency tone that does not cause the panel 104 to produce an audible sound. The processor 310 can measure the coil current 404 and the coil voltage 402 while the magnetic coil 210 is energized with the pilot tone. Based on the resistance of the magnetic coil 210 and the known temperature coefficient of resistance, the processor 310 can determine the magnetic coil temperature. Based on the association between the magnetic coil temperature and the panel temperature, the processor 310 can determine the initial panel temperature 354.

In some examples, the initial panel temperature 354 can be a previously calculated final panel temperature 442. For example, the processor 310 may determine the final panel temperature 442 at a second time 520, based on the energy 422 and the panel thermal model 352. The processor 310 may store the final panel temperature 442 at the second time 520 in the memory 350, for later reference as an initial panel temperature 354 in a new calculation of final panel temperature 442.

Based on the initial panel temperature 354 and the panel temperature change 432, the panel temperature calculator 440 can calculate the final, or second, panel temperature 442. The final panel temperature 442 can be the temperature of the panel 104 at the second time 520. The panel temperature calculator 440 can calculate the final panel temperature 442, for example, by adding the panel temperature change 432 to the initial panel temperature 354. The panel temperature calculator 440 can output the final panel temperature 442 to the panel temperature limiter 450.

The panel temperature limiter 450 can compare the final panel temperature 442 to a threshold panel temperature. The threshold can be, for example, a maximum allowable panel temperature. In some examples, the threshold panel temperature can be a panel temperature within a buffer range to the maximum allowable panel temperature. For example, a maximum allowable panel temperature may be 45° C. To provide a buffer range of 5° C., the threshold panel temperature may be set to 40° C.

In some implementations, the temperature change calculator 430 can output the panel temperature change 432 to the temperature rate of change calculator 470 in addition to the panel temperature calculator 440. Based on the panel temperature change 432 and the time duration between the first time 510 and the second time 520, the temperature rate of change calculator 470 can determine the panel temperature rate of change 434. The panel temperature rate of change 434 can be indicated, for example, in a unit of degrees Celsius per minute (° C./min). The temperature rate of change calculator 470 can output the temperature rate of change 434 to the panel temperature limiter 450.

The panel temperature limiter 450 can compare the temperature rate of change 434 to a threshold temperature rate of change. The threshold can be, for example, a maximum allowable temperature rate of change. The threshold rate of change may vary based on the final panel temperature 442. For example, at a final panel temperature of 35° C., the threshold rate of change may be set to +2° C./min. At a final panel temperature of 38° C., the threshold rate of change may be set to +1° C./min. Thus, as the final panel temperature 442 rises, approaching the threshold panel temperature, the threshold rate of change may decrease.

Based on determining that the final panel temperature 442 exceeds the threshold panel temperature, that the temperature rate of change 434 exceeds the threshold temperature rate of change, or both, the panel temperature limiter 450 can determine to output a signal adjustment 452 to the signal adjuster 460. The signal adjustment can be, for example, a mathematical function to be applied to the audio signal 458 in order to generate an adjusted audio signal 462.

The panel temperature limiter 450 can be programmed with rules determining the signal adjustment 452 for various final panel temperatures 442 and temperature rates of change 434. For example, a rule may state that when the final panel temperature 442 exceeds the threshold panel temperature, the signal adjustment 452 includes a function of reducing the audio signal power by a divisor of two. In another example, a rule may state that when the temperature rate of change 434 exceeds the threshold temperature rate of change, the signal adjustment 452 includes a function of reducing the audio signal power by a factor of one-third. In another example, a rule may state that when the final panel temperature 442 exceeds the threshold panel temperature, the signal adjustment 452 includes turning off the audio signal.

In some examples, the panel temperature limiter 450 can be programmed to output the signal adjustment 452 for a designated period of time. For example, in response to determining that the final panel temperature 442 exceeds the threshold panel temperature, the panel temperature limiter 450 may determine to output a signal adjustment 452 of reducing the audio signal power by one half for a period of time of one minute. In some examples, following the period of time of one minute, the panel temperature limiter 450 can automatically remove the signal adjustment 452.

In some examples, the panel temperature limiter 450 may output a signal adjustment that applies only to certain frequencies of the audio signal 458. In some examples, the panel temperature limiter 450 may output multiple signal adjustments that apply to multiple frequency ranges of the audio signal 458. For example, the panel temperature limiter 450 may output a first signal adjustment that applies to a first range of frequencies of the audio signal 458, and a second signal adjustment that applies to a second range of frequencies of the audio signal 458.

In some examples, the panel temperature limiter 450 can determine to remove the signal adjustment 452. For example, the panel temperature limiter 450 may have previously determined to apply a signal adjustment 452 to the audio signal 458. The panel temperature limiter 450 can continue to monitor the final panel temperature 442 and/or the temperature rate of change 434. When the final panel temperature 442, the temperature rate of change 434, or both, return below the programmed thresholds, the panel temperature limiter 450 can determine to remove the previously applied signal adjustment 452.

The signal adjuster 460 receives the audio signal 458 from the signal generator 340, and the signal adjustment 452 from the panel temperature limiter 450. The signal adjuster 460 can apply the signal adjustment 452 to the audio signal 458. For example, for a signal adjustment of reducing by one-half, the signal adjuster 460 can reduce the power of the audio signal 458 by one-half. The signal adjuster 460 outputs an adjusted audio signal 462 to the magnetic coil 210.

In some examples, instead of or in addition to the processor 310 applying the signal adjustment 452 to the audio signal 458, the processor 310 may transmit a command to the amplifier 360 to adjust amplification. For example, the processor 310 may transmit a command to the amplifier 360 to reduce amplification of the analog electrical signal, e.g., by one-half. The amplifier 360 can then reduce the amplification of the analog electrical signal for a designated period of time, or until receiving a subsequent command from the processor 310 to cease reducing the amplification.

When the power of the audio signal is reduced, the current through the magnetic coil 210 is reduced. Due to the current being reduced, the magnetic coil 210 may then increase temperature at a slower rate, cease increasing in temperature, or decrease in temperature. Due to thermal communication between the magnetic coil 210 and the panel 104, the panel 104 may likewise increase temperature at a slower rate, cease increasing in temperature, or decrease in temperature. The processor 310 can continue to monitor coil current 404 and coil voltage 402 in order to re-calculate changes in panel temperature.

Figure 6:
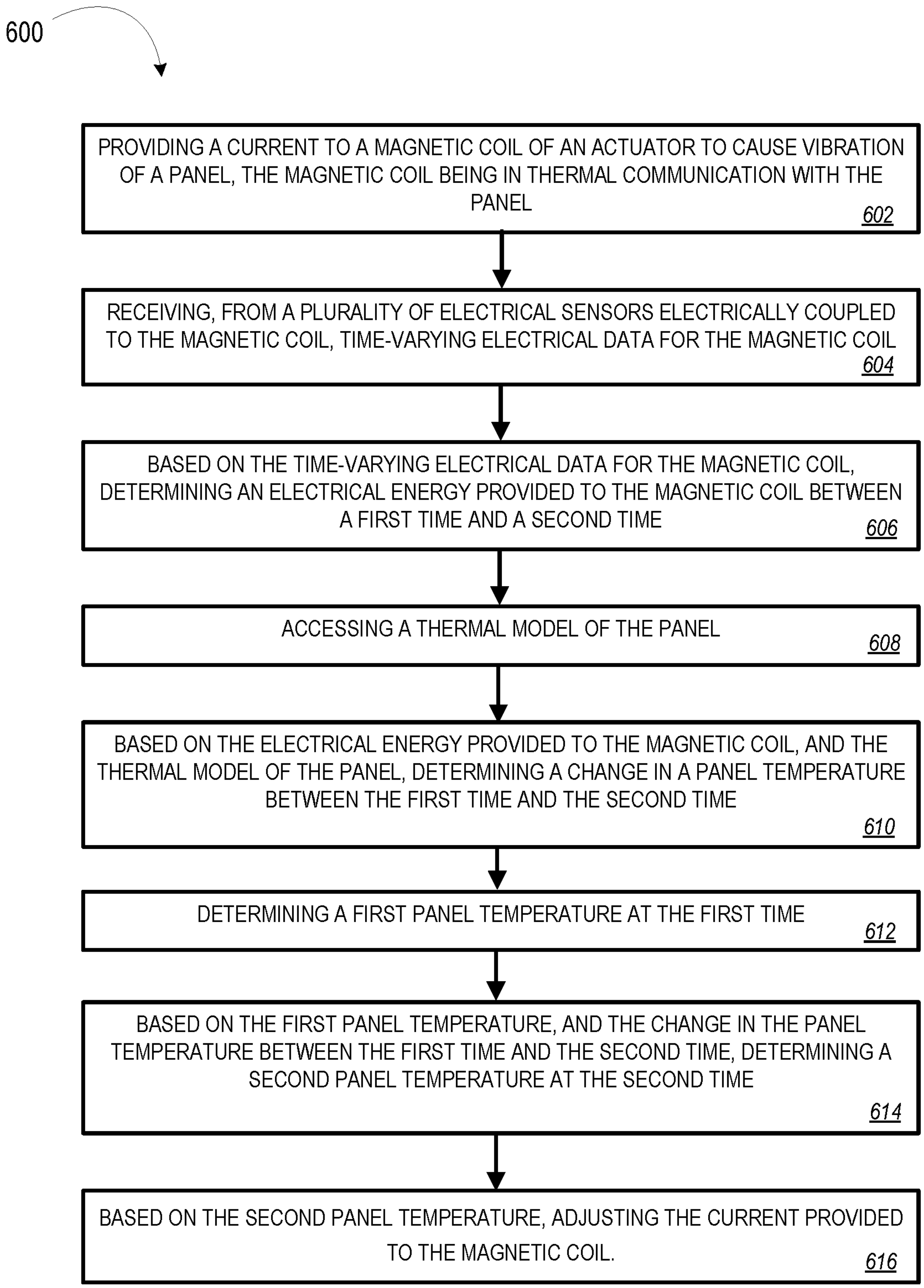
FIG. 6 is a flowchart of an example process for monitoring temperature of a panel in a panel audio device.

FIG. 6 is a flowchart of an example process 600 for monitoring temperature of a panel in a panel audio device. The process 600 can be performed, for example, by the electronic control module 220.

Briefly, process 600 includes providing a current to a magnetic coil of an actuator to cause vibration of a panel, the magnetic coil being in thermal communication with the panel (602), receiving, from a plurality of electrical sensors electrically coupled to the magnetic coil, time-varying electrical data for the magnetic coil (604), based on the time-varying electrical data for the magnetic coil, determining an electrical energy provided to the magnetic coil between a first time and a second time (606), accessing a thermal model of the panel (608), based on the electrical energy provided to the magnetic coil, and the thermal model of the panel, determining a change in a panel temperature between the first time and the second time (610), determining a first panel temperature at the first time (612), based on the first panel temperature, and the change in the panel temperature between the first time and the second time, determining a second panel temperature at the second time (614), and based on the second panel temperature, adjusting the current provided to the magnetic coil (616).

In additional detail, the process 600 includes providing a current to a magnetic coil of an actuator to cause vibration of a panel, the magnetic coil being in thermal communication with the panel (602). For example, the magnetic coil can be attached to a surface of the panel such that when a temperature of the magnetic coil rises, the panel temperature likely also rises.

The process 600 includes receiving, from a plurality of electrical sensors electrically coupled to the magnetic coil, time-varying electrical data for the magnetic coil (604). For example, the time-varying electrical data can include a time-varying current through the magnetic coil, and a time-varying voltage across the magnetic coil.

The process 600 includes, based on the time-varying electrical data for the magnetic coil, determining an electrical energy provided to the magnetic coil between a first time and a second time (606). The first time may be, for example, a time of zero seconds. The second time may be, for example, a time of sixty seconds. Based on the current data and the voltage data for the magnetic coil, the electronic control module can determine a time-varying power supplied to the magnetic coil. For example, the time-varying power can include a steady power of 10W supplied to the magnetic coil for a duration of sixty seconds. Based on the power, the electronic control module can determine the electrical energy provided to the magnetic coil. For example, based on the power of 10 W over sixty seconds, the electronic control module can determine an electrical energy of 600 Joules.

The process 600 includes accessing a thermal model of the panel (608). For example, the thermal model of the panel may accessed from a memory of the electronic control module. The thermal model of the panel may include an association curve between the energy provided to the magnetic coil and the change in panel temperature. The thermal model of the panel may include data representing heat transfer from the magnetic coil to the panel, and from the panel to ambient. The thermal model of the panel can be generated using, for example, mathematical calculations, experimental results, or both. The thermal model of the panel may be generated prior to operation, during a calibration phase, during operation, or a combination of these.

The process 600 includes, based on the electrical energy provided to the magnetic coil, and the thermal model of the panel, determining a change in a panel temperature between the first time and the second time (610). For example, based on the electrical energy of 600 Joules, and the thermal model of the panel associating the energy to the change in temperature, the electronic control module may determine a change in a panel temperature of +3° C. between zero seconds and sixty seconds.

The process 600 includes determining a first panel temperature at the first time (612). The first panel temperature may be stored in the memory of the electronic control module. The first panel temperature may be based on a measurement taken while a pilot tone is applied to the magnetic coil. The first panel temperature may be, for example, 38° C.

The process 600 includes, based on the first panel temperature, and the change in the panel temperature between the first time and the second time, determining a second panel temperature at the second time (614). For example, based on the first panel temperature of 38° C., and the change in panel temperature of +3° C., the electronic control module can determine a second panel temperature of 41° C.

The process 600 includes, based on the second panel temperature, adjusting the current provided to the magnetic coil (616). For example, the electronic control module can compare the second panel temperature to a threshold panel temperature. The threshold panel temperature may be, for example, 40° C. The electronic control module may determine that the second panel temperature of 41° C. exceeds the threshold panel temperature of 40° C. In response to determining that the second panel temperature exceeds the threshold panel temperature, the electronic control module can determine to adjust the current provided to the magnetic coil. For example, the electronic control module may determine to adjust the current by reducing the current, for example, by a factor of one-half or one-third.

Figure 7:
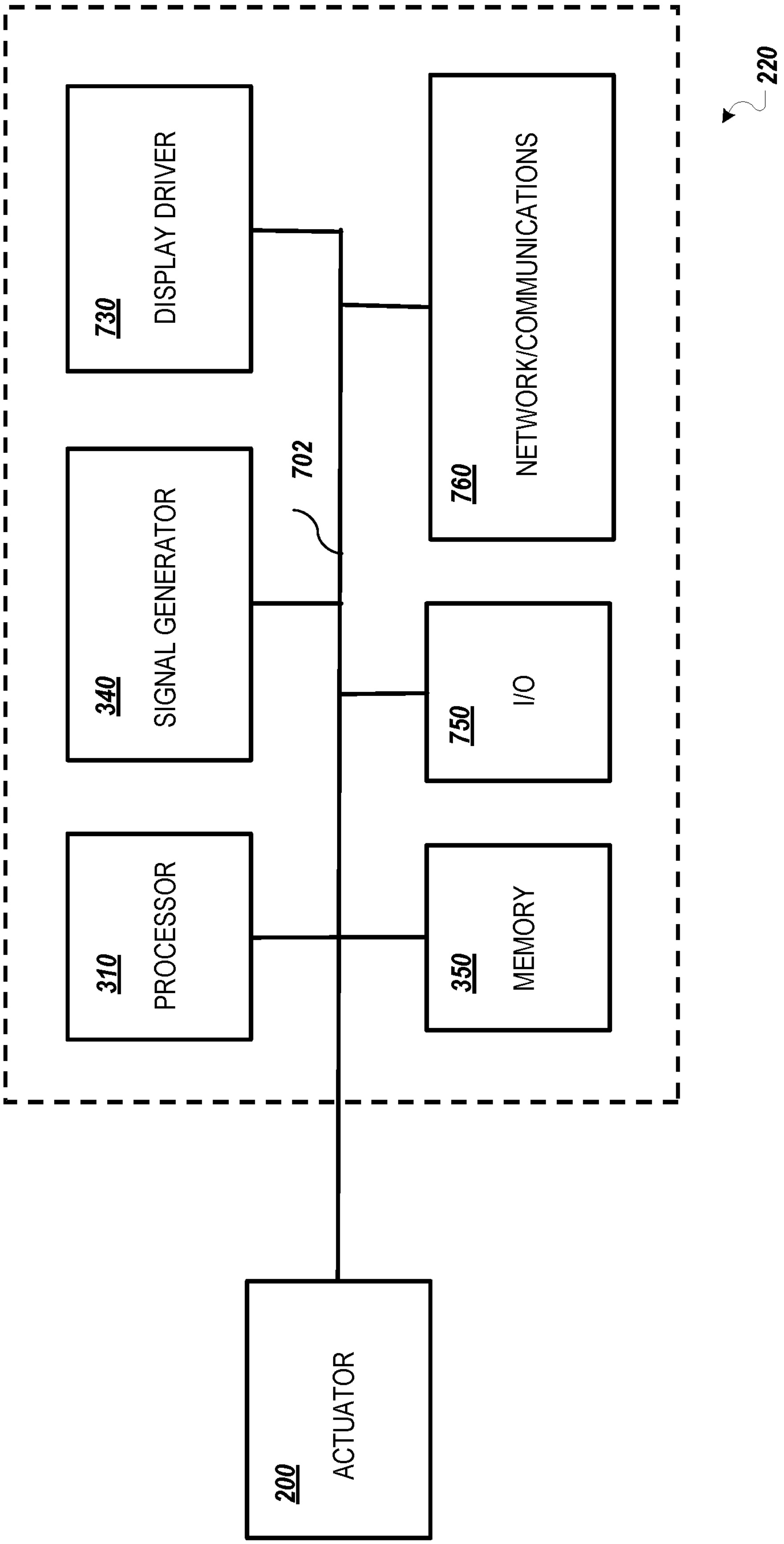
FIG. 7 is a schematic diagram of an embodiment of an electronic control module for a mobile device.

Referring to FIG. 7, an exemplary electronic control module 220 of a mobile device, such as mobile device 100, includes a processor 310, memory 350, a display driver 730, a signal generator 340, an input/output (I/O) module 750, and a network/communications module 760. These components are in electrical communication with one another (e.g., via a signal bus 702) and with the actuator module 200.

The processor 310 may be implemented as any electronic device capable of processing, receiving, or transmitting data or instructions. For example, the processor 310 can be a microprocessor, a central processing unit (CPU), an application-specific integrated circuit (ASIC), a digital signal processor (DSP), or combinations of such devices.

The memory 350 has various instructions, computer programs or other data stored thereon. The instructions or computer programs may be configured to perform one or more of the operations or functions described with respect to the mobile device. For example, the instructions may be configured to control or coordinate the operation of the device's display via the display driver 730, the signal generator 340, one or more components of the I/O module 750, one or more communication channels accessible via network/communications module 760, one or more sensors (e.g., biometric sensors, temperature sensors, accelerometers, optical sensors, barometric sensors, moisture sensors and so on), and/or the actuator module 200.

The signal generator 340 is configured to produce AC waveforms of varying amplitudes, frequency, and/or pulse profiles suitable for the actuator module 200 and producing acoustic and/or haptic responses via the actuator. Although depicted as a separate component, in some embodiments, the signal generator 340 can be part of the processor 310. In some embodiments, the signal generator 340 can include an amplifier, e.g., as an integral or separate component thereof.

The memory 350 can store electrical data that can be used by the mobile device. For example, the memory 350 can store electrical data or content such as, for example, audio and video files, documents and applications, device settings and user preferences, timing and control signals or data for the various modules, data structures or databases, and so on. The memory 350 may also store instructions for recreating the various types of waveforms that may be used by the signal generator 340 to generate signals for the actuator module 200. The memory 350 may be any type of memory such as, for example, random access memory, read-only memory, Flash memory, removable memory, or other types of storage elements, or combinations of such devices.

As briefly discussed above, the electronic control module 220 may include various input and output components represented in FIG. 7 as I/O module 750. Although the components of I/O module 750 are represented as a single item in FIG. 7, the mobile device may include a number of different input components, including buttons, microphones, switches, and dials for accepting user input. In some embodiments, the components of the I/O module 750 may include one or more touch sensor and/or force sensors. For example, the mobile device's display may include one or more touch sensors and/or one or more force sensors that enable a user to provide input to the mobile device.

Each of the components of the I/O module 750 may include specialized circuitry for generating signals or data. In some cases, the components may produce or provide feedback for application-specific input that corresponds to a prompt or user interface object presented on the display.

As noted above, the network/communications module 760 includes one or more communication channels. These communication channels can include one or more wireless interfaces that provide communications between the processor 310 and an external device or other electronic device. In general, the communication channels may be configured to transmit and receive data and/or signals that may be interpreted by instructions executed on the processor 310. In some cases, the external device is part of an external communication network that is configured to exchange data with other devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces, Wi-Fi interfaces, TCP/IP interfaces, network communications interfaces, or any conventional communication interfaces.

In some implementations, one or more of the communication channels of the network/communications module 760 may include a wireless communication channel between the mobile device and another device, such as another mobile phone, tablet, computer, or the like. In some cases, output, audio output, haptic output or visual display elements may be transmitted directly to the other device for output. For example, an audible alert or visual warning may be transmitted from the mobile device 100 to a mobile phone for output on that device and vice versa. Similarly, the network/communications module 760 may be configured to receive input provided on another device to control the mobile device. For example, an audible alert, visual notification, or haptic alert (or instructions therefore) may be transmitted from the external device to the mobile device for presentation.

The actuator technology disclosed herein can be used in panel audio systems, e.g., designed to provide acoustic and/or haptic feedback. The panel may be a display system, for example based on OLED of LCD technology. The panel may be part of a smartphone, tablet computer, or wearable devices (e.g., smartwatch or head-mounted device, such as smart glasses).

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

Other embodiments are in the following claims.

What is claimed is:

1. A panel audio loudspeaker, comprising:

a panel;

an actuator attached to a surface of the panel and configured to cause vibration of the panel, the actuator comprising a magnetic coil in thermal communication with the panel;

a plurality of electrical sensors electrically coupled to the magnetic coil and configured to output time-varying electrical data for the magnetic coil; and an electronic control module in communication with the magnetic coil and the plurality of electrical sensors, wherein the electronic control module is configured to perform operations comprising:

providing a current to the magnetic coil;

receiving, from the plurality of electrical sensors, the time-varying electrical data for the magnetic coil;

based on the time-varying electrical data for the magnetic coil, determining an electrical energy provided to the magnetic coil between a first time and a second time;

accessing a thermal model of the panel; and based on the electrical energy provided to the magnetic coil, and the thermal model of the panel, determining a change in a panel temperature between the first time and the second time.

2. The panel audio loudspeaker of claim 1, wherein the time-varying electrical data comprises one or more of:

a time-varying current through the magnetic coil; and a time-varying voltage across the magnetic coil.

3. The panel audio loudspeaker of claim 1, wherein the thermal model of the panel comprises one or more of:

data representing heat transfer from the magnetic coil to the panel; and data representing heat transfer from the panel to ambient.

4. The panel audio loudspeaker of claim 1, wherein the thermal model of the panel comprises an association curve between the electrical energy provided to the magnetic coil and the change in the panel temperature.

5. The panel audio loudspeaker of claim 1, wherein determining the electrical energy provided to the magnetic coil comprises:

determining, from the time-varying electrical data for the magnetic coil, a time-varying power provided to the magnetic coil; and integrating the time-varying power between the first time and the second time.

6. The panel audio loudspeaker of claim 1, the operations further comprising:

determining, from the time-varying electrical data for the magnetic coil and the thermal model of the panel, a first panel temperature at the first time;

based on the first panel temperature, and the change in the panel temperature between the first time and the second time, determining a second panel temperature at the second time; and based on the second panel temperature, adjusting the current provided to the magnetic coil.

7. The panel audio loudspeaker of claim 1, the operations further comprising:

determining, from the change in the panel temperature between the first time and the second time, a rate of change of the panel temperature; and based on the rate of change of the panel temperature, adjusting the current provided to the magnetic coil.

8. The panel audio loudspeaker of claim 1, wherein the electronic control module comprises one or more of an audio signal source, an amplifier, and a digital signal processor.

9. The panel audio loudspeaker of claim 1, wherein the panel comprises a display panel.

10. A mobile device, comprising:

a housing; and the panel audio loudspeaker of claim 1.

11. The mobile device of claim 10, wherein the mobile device comprises a mobile phone or a tablet computer.

12. A wearable device comprising:

a housing; and the panel audio loudspeaker of claim 1.

13. The wearable device of claim 12, wherein the wearable device is a smart watch or a head-mounted display.

14. A method comprising:

providing a current to a magnetic coil of an actuator to cause vibration of a panel, the magnetic coil being in thermal communication with the panel;

receiving, from a plurality of electrical sensors electrically coupled to the magnetic coil, time-varying electrical data for the magnetic coil;

based on the time-varying electrical data for the magnetic coil, determining an electrical energy provided to the magnetic coil between a first time and a second time;

accessing a thermal model of the panel; and based on the electrical energy provided to the magnetic coil, and the thermal model of the panel, determining a change in a panel temperature between the first time and the second time.

15. The method of claim 14, wherein the time-varying electrical data comprises one or more of:

a time-varying current through the magnetic coil; and a time-varying voltage across the magnetic coil.

16. The method of claim 14, wherein the thermal model of the panel comprises one or more of:

data representing heat transfer from the magnetic coil to the panel; and data representing heat transfer from the panel to ambient.

17. The method of claim 14, wherein determining the electrical energy provided to the magnetic coil comprises:

determining, from the time-varying electrical data for the magnetic coil, a time-varying power provided to the magnetic coil; and integrating the time-varying power between the first time and the second time.

18. The method of claim 14, further comprising:

determining, from the time-varying electrical data for the magnetic coil and the thermal model of the panel, a first panel temperature at the first time;

based on the first panel temperature, and the change in the panel temperature between the first time and the second time, determining a second panel temperature at the second time; and based on the second panel temperature, adjusting the current provided to the magnetic coil.

19. The method of claim 14, further comprising:

determining, from the change in the panel temperature between the first time and the second time, a rate of change of the panel temperature; and based on the rate of change of the panel temperature, adjusting the current provided to the magnetic coil.

20. The method of claim 14, wherein adjusting the current provided to the magnetic coil comprises reducing the current provided to the magnetic coil.

* * * * *